United States Patent
Zhang

(10) Patent No.: US 12,294,632 B2
(45) Date of Patent: May 6, 2025

(54) METHOD AND NETWORK NODE FOR COMMUNICATION WITH A NON-IP DEVICE

(71) Applicant: Telefonaktiebolaget LM Ericsson (publ), Stockholm (SE)

(72) Inventor: Fengpei Zhang, Guangdong (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/779,640

(22) PCT Filed: Nov. 25, 2019

(86) PCT No.: PCT/CN2019/120664
§ 371 (c)(1),
(2) Date: May 25, 2022

(87) PCT Pub. No.: WO2021/102641
PCT Pub. Date: Jun. 3, 2021

(65) Prior Publication Data
US 2023/0008728 A1    Jan. 12, 2023

(51) Int. Cl.
G06F 15/16   (2006.01)
*H04L 67/12*   (2022.01)
*H04L 67/55*   (2022.01)
*H04L 67/562*   (2022.01)

(52) U.S. Cl.
CPC .............. *H04L 67/55* (2022.05); *H04L 67/12* (2013.01); *H04L 67/562* (2022.05)

(58) Field of Classification Search
CPC ........ H04L 67/55; H04L 67/562; H04L 67/12
See application file for complete search history.

(56) References Cited

U.S. PATENT DOCUMENTS

| | | | | |
|---|---|---|---|---|
| 2009/0172117 A1* | 7/2009 | Bedi | ................. | H04W 52/0216 709/206 |
| 2017/0332421 A1* | 11/2017 | Sternberg | .............. | H04W 76/11 |
| 2019/0334995 A1* | 10/2019 | Shanmugam | ........... | H04W 4/80 |
| 2020/0053802 A1* | 2/2020 | Li | ......................... | H04W 12/06 |

(Continued)

FOREIGN PATENT DOCUMENTS

| | | |
|---|---|---|
| WO | 2018035839 A1 | 3/2018 |
| WO | 2018069259 A1 | 4/2018 |

OTHER PUBLICATIONS

3GPP, "3GPP TR 23.730 V14.0.0", 3rd Generation Partnership Project; Technical Specification Group Services and System Aspects; Study on extended architecture support for Cellular Internet of Things (CIoT) (Release 14), (Dec. 2016), 1-83.

(Continued)

*Primary Examiner* — Normin Abedin
(74) *Attorney, Agent, or Firm* — Murphy, Bilak & Homiller, PLLC

(57) ABSTRACT

Embodiments of the present disclosure provide a method performed in a network exposure node. The method comprises establishing a connection between a first terminal device and a Message Queuing Telemetry Transport for Sensor Network, MQTT-SN, gateway, facilitating subscription of the first terminal device to a topic via the MQTT-SN gateway and facilitating data publishing of a second terminal device for the topic towards the first terminal device via the MQTT gateway.

18 Claims, 14 Drawing Sheets

(56) References Cited

U.S. PATENT DOCUMENTS

2020/0068047 A1* 2/2020 Huang .................. H04L 67/141
2020/0389528 A1* 12/2020 Ha ........................ H04L 67/141

OTHER PUBLICATIONS

3GPP, "3GPP TS 23.682 V15.4.0", 3rd Generation Partnership Project; Technical Specification Group Services and System Aspects; Architecture enhancements to facilitate communications with packet data networks and applications (Release 15), Mar. 2018, 1-124.
3GPP, "3GPP TS 29.122 V2.0.0", 3rd Generation Partnership Project; Technical Specification Group Core Network and Terminals; T8 reference point for Northbound APIs (Release 15), Jun. 2018, 1-255.
Banks, Andrew, "MQTT Version 5.0", Oasis, Committee Specification 02, May 15, 2018, 1-137.
Convida Wireless LLC, et al., "Concluding Key Issue #9", SA WG2 Meeting #128, S2-186611, Vilnius, Lithuania, Jul. 2-6, 2018, 1-11.
Huawei, et al., "Solution for Key Issue 2 Reliable delivery of data between UE and SCEF using existing standards", SA WG2 Meeting #116bis, S2-164897, Sanya, China, 29 Aug. 29-Sep. 2, 2016, 1-11.
Stanford-Clark, Andy, et al., "MQTT for Sensor Networks (MQTT-SN)", Protocol Specification, Version 1.2, International Business Machines Corporation, Nov. 14, 2013, 1-28.

* cited by examiner

METHOD AND NETWORK NODE FOR COMMUNICATION WITH A NON-IP DEVICE

TECHNICAL FIELD

The present disclosure relates to communication technology, and more particularly, to methods and network nodes for communication with a non-Internet Protocol (Non-IP) device.

BACKGROUND

This section introduces aspects that may facilitate better understanding of the present disclosure. Accordingly, the statements of this section are to be read in this light and are not to be understood as admissions about what is in the prior art or what is not in the prior art.

Message Queuing Telemetry Transport (MQTT) is a Client Server publish/subscribe (pub/sub) messaging transport protocol. It is light weight, open, simple, and designed to be easy to implement. These characteristics make it ideal for use in many situations, including constrained environments such as for communication in Machine to Machine (M2M) and Internet of Things (IoT) contexts where a small code footprint is required and/or network bandwidth is at a premium. Reference can be made to MQTT Version 5.0 OASIS Standard (https://docs.oasis-open.org/mqtt/mqtt/v5.0/os/mqtt-v5.0-os.docx), which is incorporated herein by reference in its entirety.

MQTT for Sensor Network (MQTT-SN) is a version of MQTT which is adapted to the peculiarities of a wireless communication environment. Wireless radio links have in general higher failure rates than wired ones due to their susceptibility to fading and interference disturbances. They have also a lower transmission rate. Even though MQTT-SN was originally developed for running on top of the ZigBee, it is designed in such a way that it is agnostic of the underlying networking services. Reference can be made to MQTT-SN Protocol Specification Version 1.2, which is incorporated herein by reference in its entirety.

FIG. 1 shows an MQTT-SN architecture. As shown, there are three kinds of MQTT-SN components: MQTT-SN clients, MQTT-SN gateways (GW), and MQTT-SN forwarders. MQTT-SN clients connect themselves to a MQTT server, i.e. MQTT broker as shown, via a MQTT-SN GW using the MQTT-SN protocol. A MQTT-SN GW may or may not be integrated with a MQTT server. In case of a stand-alone GW, the MQTT protocol is used between the MQTT server and the MQTT-SN GW. Its main function is the translation between MQTT and MQTT-SN.

The $3^{rd}$ Generation Partnership Project (3GPP) has provided an Evolved Packet Core (EPC) based Service Capability Exposure Function (SCEF), or the $5^{th}$ Generation Core (5GC) based Network Exposure Function (NEF), to securely expose services and capabilities provided via 3GPP network interfaces. For example, a Services Capability Server (SCS) or Application Server (AS) can interact with the SCEF/NEF for applications including, but not limited to, Non-Internet Protocol (IP) Data Delivery (NIDD), whereby the SCS/AS can transmit/receive Non-IP data to/from a client or user equipment (UE). The NIDD feature is used to handle Mobile Originated (MO) and Mobile Terminated (MT) communication with UEs.

Currently Non-IP via SCEF or NEF only supports AS to terminal device bidirectional communication. There is no pub/sub communication support among Non-IP devices, or between IP and Non-IP devices.

SUMMARY

It is an object of the present disclosure to provide methods and network nodes for communication with a Non-IP device.

According to a first aspect of the present disclosure, there is provided a method performed in a network exposure node. The method comprises establishing a connection between a first terminal device, e.g. a Non-IP device, and an MQTT-SN gateway. The method also comprises facilitating subscription of the first terminal device to a topic via the MQTT-SN gateway. In a further embodiment of the present disclosure, the method may further comprise facilitating data publishing of a second terminal device, e.g. an IP device or a Non-IP device, for the topic towards the first terminal device via the MQTT gateway.

In an embodiment of the present disclosure, establishing the connection may comprise: receiving, from the first terminal device, a connection message to setup a connection with the MQTT-SN gateway; transmitting the connection message to the MQTT-SN gateway; receiving a first acknowledgement message in response to the connection message from the MQTT-SN gateway; and transmitting the first acknowledgement message to the first terminal device.

In an embodiment of the present disclosure, facilitating the subscription may comprise: receiving, from the first terminal device, a subscription message to subscribe to the topic; transmitting the subscription message to the MQTT-SN gateway; receiving, from the MQTT-SN gateway, a second acknowledgement message in response to the subscription message; and transmitting the second acknowledgement message to the first terminal device.

In an embodiment of the present disclosure, facilitating the data publishing may comprise: receiving, from the MQTT-SN gateway, a publishing message to publish data for the topic; and transmitting the publishing message to the first terminal device.

In an embodiment of the present disclosure, facilitating the data publishing may further comprise: receiving a third acknowledgement message in response to the publishing message from the first terminal device; and transmitting the third acknowledgement message to the MQTT-SN gateway.

In a further embodiment of the present disclosure, the publishing message may include a first parameter indicating a size of the data to be published, a second parameter indicating whether there is a subsequent block of the data to be published, and a third parameter indicating a data block index.

In a further embodiment of the present disclosure, the third acknowledgement message may include a first return code indicating continuation of data publishing or a second return code indicating rejection of data publishing with a reason of oversize.

In another embodiment of the present disclosure, the third acknowledgement message may be a PUBREC message according to an MQTT-SN, protocol. The third acknowledgement message may include a third return code indicating one of the following for data publishing: acceptance, rejection with a reason, continuation, or reserve.

In yet another embodiment of the present disclosure, the MQTT-SN gateway may be collocated with an MQTT server or connected to the MQTT server according to an MQTT protocol.

According to a second aspect of the present disclosure, there is provided a network exposure node. The network exposure node comprises a processor and a memory, the memory comprising instructions executable by the processor whereby the network exposure node is operative to perform the method according to the first aspect of the present disclosure.

According to a third aspect of the present disclosure, there is provided a computer readable storage medium having computer program instructions stored thereon. The computer program instructions, when executed by a processor in a network exposure function node, cause the network exposure function node to perform the method according to the first aspect of the present disclosure.

According to a fourth aspect of the present disclosure, there is provided a method performed in an MQTT-SN gateway. The method comprises establishing a connection with a first terminal device, e.g. a Non-IP device, via a network exposure node. The method also comprises facilitating subscription of the first terminal device to a topic via the network exposure node. In a further embodiment of the present disclosure, the method may further comprise facilitating data publishing of a second terminal device, e.g. an IP device or Non-IP device, for the topic towards the first terminal device via the network exposure node.

In an embodiment of the present disclosure, establishing the connection may comprise receiving, from the first terminal device, a connection message to setup a connection via the network exposure node and transmitting a first acknowledgement message in response to the connection message towards the first terminal device via the network exposure node.

In an embodiment of the present disclosure, facilitating the subscription may comprise receiving, from the first terminal device, a subscription message to subscribe to the topic via the network exposure node and transmitting a second acknowledgement message in response to the subscription message towards the first terminal device via the network exposure node.

In an embodiment of the present disclosure, facilitating the data publishing may comprise receiving a first publishing message to publish data for the topic and transmitting a second publishing message including at least the first publishing message towards the first terminal device via the network exposure node.

In an embodiment of the present disclosure, facilitating the data publishing may further comprise receiving, from the first terminal device, a third acknowledgement message in response to the second publishing message via the network exposure node and determining whether to continue the data publishing of the second terminal device based at least on the acknowledgement message.

In a further embodiment of the present disclosure, the second publishing message may include a first parameter indicating a size of the data to be published, a second parameter indicating whether there is a subsequent block for the data to be published, and a third parameter indicating a data block index.

In a further embodiment of the present disclosure, the third acknowledgement message may include a first return code indicating continuation of data publishing or a second return code indicating rejection of data publishing with a reason of oversize.

In another embodiment of the present disclosure, the third acknowledgement message may be a PUBREC message according to an MQTT-SN protocol. The third acknowledgement message may include a third return code indicating one of the following for data publishing: acceptance, rejection with a reason, continuation, or reserve.

In yet another embodiment of the present disclosure, the MQTT-SN gateway may be collocated with a MQTT server or connected to the MQTT server according to an MQTT protocol.

According to a fifth embodiment of the present disclosure, there is provided an MQTT-SN gateway. The MQTT-SN gateway comprises a processor and a memory, the memory comprising instructions executable by the processor whereby the MQTT-SN gateway is operative to perform the method according to the fourth aspect of the present disclosure.

According to a sixth aspect of the present disclosure, there is provided a computer readable storage medium having computer program instructions stored thereon. The computer program instructions, when executed by a processor in an MQTT-SN gateway, cause the MQTT-SN gateway to perform the method according to the fourth aspect of the present disclosure.

According to a seventh aspect of the present disclosure, there is provided a method performed in a Non-IP device. The method comprises establishing a connection with an MQTT-SN gateway via a network exposure node. The method also comprises subscribing to a topic through the MQTT-SN gateway via the network exposure node. In a further embodiment of the present disclosure, the method may further comprise obtaining, from the MQTT-SN gateway, data publishing of a second terminal device for the topic via the network exposure node.

In an embodiment of the present disclosure, establishing the connection may comprise transmitting, towards the MQTT-SN gateway, a connection message to setup a connection with the MQTT-SN gateway via the network exposure node and receiving, from the MQTT-SN gateway, a first acknowledgement message in response to the connection message via the network exposure node.

In an embodiment of the present disclosure, subscribing to the topic may comprise transmitting, towards the MQTT-SN gateway, a subscription message to subscribe to the topic via the network exposure node and receiving, from the MQTT-SN gateway, a second acknowledgement message in response to the subscription message via the network exposure node.

In an embodiment of the present disclosure, obtaining the data publishing may comprise receiving, from the MQTT-SN gateway, a publishing message of the second terminal device to publish data for the topic via the network exposure node.

In an embodiment of the present disclosure, obtaining the data publishing may further comprise transmitting, towards the MQTT-SN gateway, a third acknowledgement message in response to the publishing message via the network exposure node.

In an embodiment of the present disclosure, the publishing message may include a first parameter indicating a size of the data to be published, a second parameter indicating whether there is a subsequent block for the data to be published, and a third parameter indicating a data block index.

In a further embodiment of the present disclosure, the third acknowledgement message may include a first return code indicating continuation of data publishing or a second return code indicating rejection of data publishing with a reason of oversize.

In another embodiment of the present disclosure, the third acknowledgement message may be a PUBREC message according to an MQTT-SN protocol. The third acknowledgement message may include a third return code indicating one of the following for data publishing: acceptance, rejection with a reason, continuation, or reserve.

In yet another embodiment of the present disclosure, the MQTT-SN gateway may be collocated with a MQTT server or connected to the MQTT server according to an MQTT protocol.

According to an eighth embodiment of the present disclosure, there is provided a Non-IP device. The Non-IP device comprises a processor and a memory. The memory comprises instructions executable by the processor whereby the Non-IP device is operative to perform the method according to the seventh aspect of the present disclosure.

According to a ninth embodiment of the present disclosure, there is provided a computer readable storage medium having computer program instructions stored thereon. The computer program instructions, when executed by a processor in a Non-IP device, cause the Non-IP device to perform the method according to the seventh aspect of the present disclosure.

With the embodiments of the present disclosure, Non-IP devices can communicate with IP devices or Non-IP devices using pub/sub communication via SCEF/NEF.

BRIEF DESCRIPTION OF THE DRAWINGS

The above and other objects, features and advantages will be more apparent from the following description of embodiments with reference to the figures, in which.

DETAILED DESCRIPTION

Figure 1:
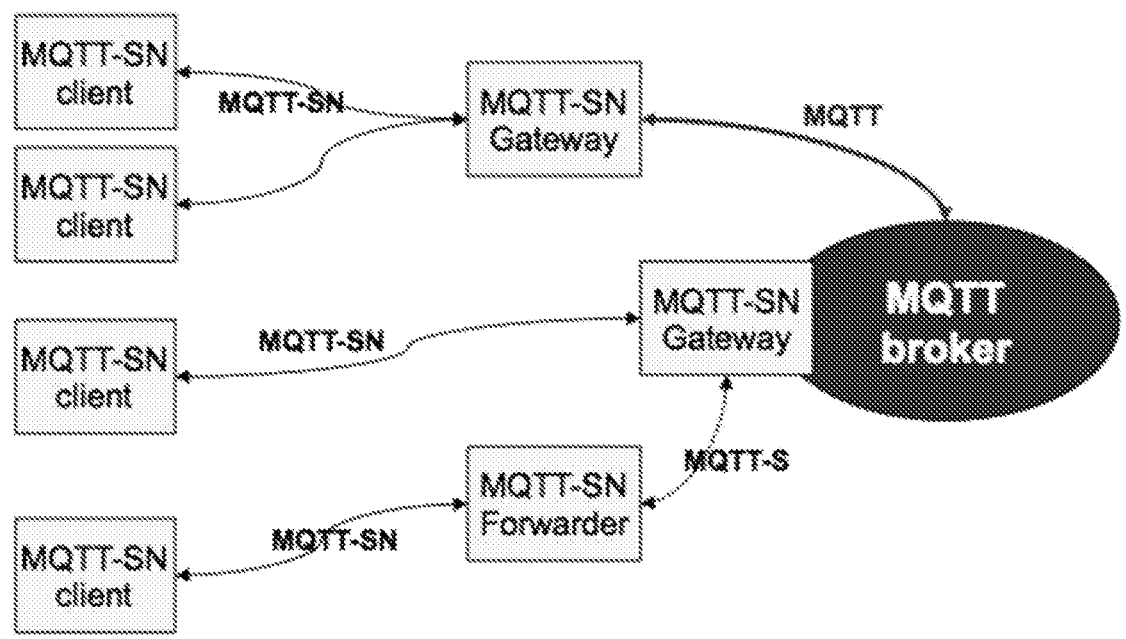
FIG. 1 shows an architecture of MQTT-SN.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "terminal device" refers to any device capable of building up a connection to the network and on which one or more Non-IP/IP clients can be running. The term "client" refers to a software or firmware that is running on a physical device and operates according to the MQTT/MQTT-SN protocol. Examples of the terminal device may include, but not limited to, IoT devices with/without sensors, smart devices, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. The terminal device may also include vehicles in V2x communications via D2D sidelink, or cellular link.

As used herein, the term "IP device" refers to a device operating according to the IP protocol. The term "Non-IP device" refers to a device operating according to the Non-IP protocol. The term "IP client" refers to a software or firmware running on an IP device. The term "Non-IP client" refers to a software or firmware running on a Non-IP device.

Please note, the communication between two terminal devices may refer to the communication between two clients running respectively on the two terminal devices. For example, the communication between an IP device and a Non-IP device refers to the communication between an IP client running on the IP device and a Non-IP client running on the Non-IP device.

In the following description and claims, unless defined otherwise, all technical and scientific terms used herein have the same meaning as commonly understood by one of ordinary skills in the art to which this disclosure belongs.

Figure 2A:
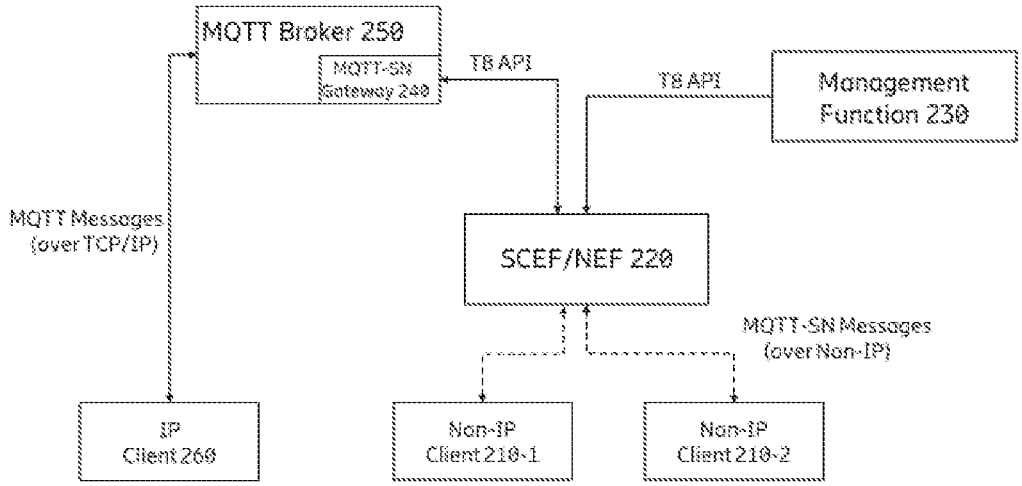
FIGS. 2A and 2B show an architecture of a communication system supporting communication with a Non-IP device where the solution according to various embodiments of the present disclosure can be applied.
Figure 2B:
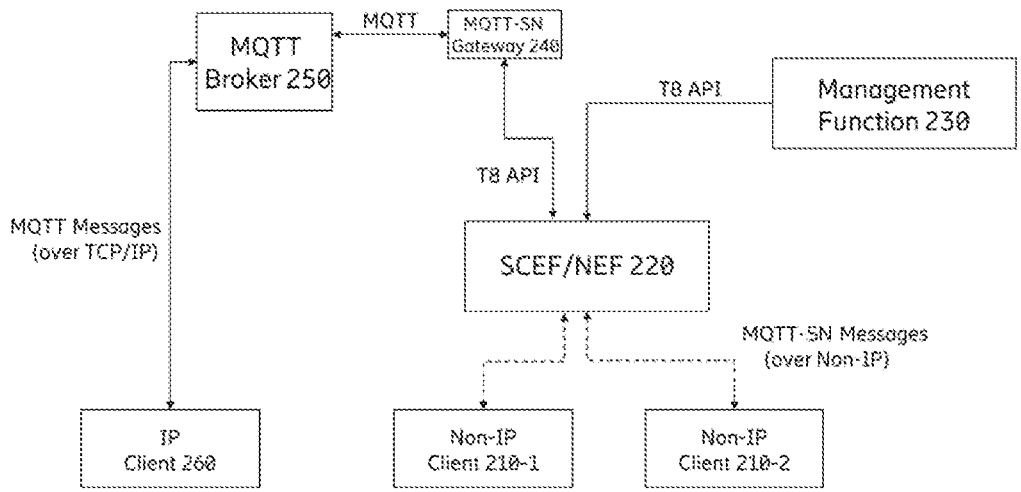

FIGS. 2A and 2B show an architecture of a communication system supporting communication with a Non-IP device where the solution according to various embodiments of the present disclosure can be applied. In particular, FIG. 2A shows an example architecture in which an MQTT-SN Gateway is collocated with an MQTT Broker (or server), while FIG. 2B shows another example architecture in which the MQTT-SN Gateway is connected to the MQTT Broker (or server) using the MQTT protocol.

As illustrated in FIGS. 2A and 2B, the MQTT Broker (or server) 250 is the main element and IP Clients 260 will directly connect with the MQTT Broker 250 through TCP (Transmission Control Protocol)/IP transport protocol. For Non-IP Clients 210, they connect with the MQTT-SN Gateway through Non-IP transport protocol. Since the MQTT Broker 250 (or server) and MQTT-SN Gateway 240 are collocated (FIG. 2A) or connected (FIG. 2B), Non-IP Clients and IP Clients can communicate with each other. Non-IP clients 210-1 and 201-2 can communicate with each other via the SCEF/NEF, MQTT-SN Gateway/MQTT Broker. The MQTT-SN Gateway interfaces with SCEF/NEF 220 through T8 API (Application Programming Interface) in order to send/receive Non-IP messages to/from Non-IP Clients. What's more, a Management Function 230, which may be part of an AS, may be needed to provision NIDD Configuration to SCEF/NEF which is the prerequisite of NIDD communication.

For ease of description without limitation, some embodiments of the present disclosure will be described below with reference to the architecture as shown in FIGS. 2A and 2B.

Figure 3:
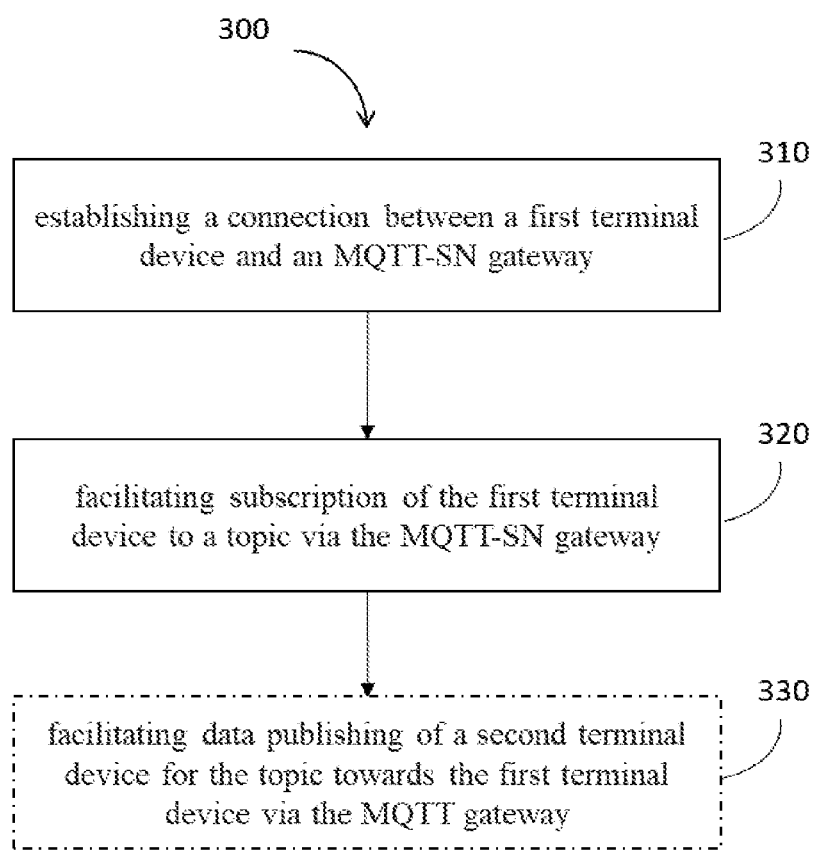
FIG. 3 is a flowchart illustrating a method performed in a network exposure node for communication with a Non-IP device according to an embodiment of the present disclosure.

FIG. 3 is a flowchart illustrating a method 300 performed in a network exposure node, e.g. SCEF or NEF 220 as shown in FIGS. 2A and 2B, for communication with a Non-IP device, particularly a Non-IP client running on the Non-IP device, according to an embodiment of the present disclosure.

As illustrated, at block 310, the network exposure node establishes a connection between a first terminal device, particularly a Non-IP client running on the first terminal device, e.g. Non-IP client 210-1 as shown in FIGS. 2A and 2B, and an MQTT-SN gateway, e.g. the MQTT-SN gateway 240 as shown in FIGS. 2A and 2B. At block 320, the network exposure node facilitates subscription of the first terminal device to a topic via the MQTT-SN gateway. Optionally, the network exposure node may facilitate at block 330 data publishing of a second terminal device, particularly, an IP client or a Non-IP client running on the second terminal device, e.g. IP client 260 or Non-IP client 210-2 as shown in FIGS. 2A and 2B, for the topic towards the first terminal device via the MQTT gateway.

Please note that the subscription and publishing may be independent. That means, the subscription can be performed without subsequent publishing operations, while the publishing can also be performed without previous subscription operations.

In different embodiments of the present disclosure, the MQTT-SN gateway may be collocated with an MQTT server 250 as shown in FIG. 2A or may be connected to the MQTT server 250 according to the MQTT protocol as shown in FIG. 2B.

In an embodiment of the present disclosure, establishing the connection between the first terminal device and the MQTT-SN gateway may comprise receiving, from the first terminal device, a connection message to setup a connection with the MQTT-SN gateway, transmitting the connection message to the MQTT-SN gateway, receiving a first acknowledgement message in response to the connection message from the MQTT-SN gateway and then transmitting the first acknowledgement message to the first terminal device.

In an embodiment of the present disclosure, the network exposure node facilitating the subscription of the first terminal device to a topic may comprise receiving, from the first terminal device, a subscription message to subscribe to the topic, transmitting the subscription message to the MQTT-SN gateway, receiving, from the MQTT-SN gateway, a second acknowledgement message in response to the subscription message and transmitting the second acknowledgement message to the first terminal device.

In an embodiment of the present disclosure, that the network exposure node facilitating the data publishing may comprise receiving, from the MQTT-SN gateway, a publishing message to publish data for the topic and transmitting the publishing message to the first terminal device. In addition, the network exposure node may further receive a third acknowledgement message in response to the publishing message from the first terminal device, and transmit the third acknowledgement message to the MQTT-SN gateway.

In an example, the publishing message may include a first parameter indicating a size of the data to be published, a second parameter indicating whether there is a subsequent block for the data to be published, and a third parameter indicating a data block index. In some embodiments, the third acknowledgement message may include a first return code indicating continuation of data publishing. In some embodiments, the third acknowledgement message may include a second return code indicating rejection of data publishing with a reason of oversize.

In some other embodiments, the third acknowledgement message may be a PUBREC message according to the MQTT-SN protocol. In such embodiments, the third acknowledgement message may include a third return code indicating one of the following for data publishing: acceptance, rejection with a reason, continuation, or reserve.

Figure 4:
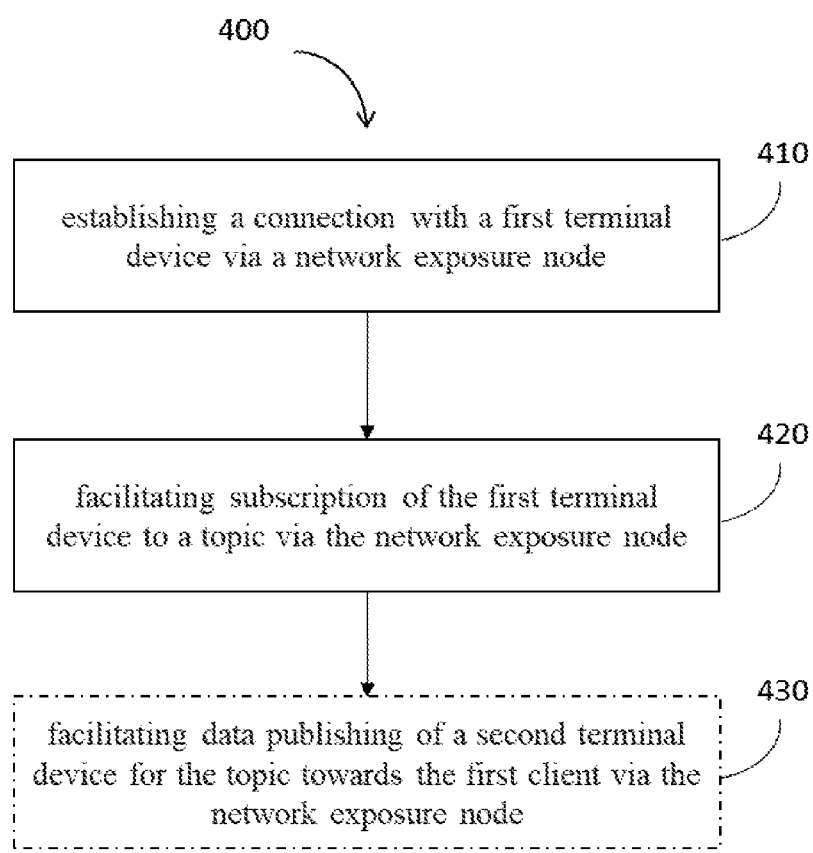
FIG. 4 is a flowchart illustrating a method performed in an MQTT-SN gateway according to an embodiment of the present disclosure.

FIG. 4 is a flowchart illustrating a method 400 performed in an MQTT-SN gateway according to an embodiment of the present disclosure.

As illustrated, at block 410, the MQTT-SN gateway, e.g. the gateway 240 as shown in FIGS. 2A and 2B, establishes a connection with a first terminal device, particularly a Non-IP client running on the first terminal device, e.g. Non-IP client 210-1 as shown in FIGS. 2A and 2B, via a network exposure node, e.g. SCEF/NEF 220 as shown in FIGS. 2A and 2B.

At block 420, the MQTT-SN gateway facilitates subscription of the first terminal device to a topic via the network exposure node. Optionally, the MQTT-SN gateway may facilitate at block 430 data publishing of a second terminal device, particularly an IP client or a Non-IP client running on the second terminal device, e.g. IP client 260 or Non-IP client 210-2 as shown in FIGS. 2A and 2B, for the topic towards the first terminal device via the network exposure node.

Please note that the subscription and publishing may be independent. That means, the subscription can be performed without subsequent publishing operations, while the publishing can also be performed without previous subscription operations.

In different embodiments of the present disclosure, the MQTT-SN gateway may be collocated with an MQTT server 250 as shown in FIG. 2A or may be connected to the MQTT server 250 according to the MQTT protocol as shown in FIG. 2B.

In an embodiment of the present disclosure, the MQTT-SN gateway establishing the connection may comprise receiving, from the first terminal device, a connection message to setup a connection via the network exposure node and then transmitting a first acknowledgement message in response to the connection message towards the first terminal device via the network exposure node.

In an embodiment of the present disclosure, the MQTT-SN gateway facilitating the subscription may comprise receiving, from the first terminal device, a subscription message to subscribe to the topic via the network exposure node and transmitting a second acknowledgement message in response to the subscription message towards the first terminal device via the network exposure node.

In an embodiment of the present disclosure, the MQTT-SN gateway facilitating the data publishing may comprise receiving, directly or indirectly (e.g. via the network exposure node) from the second terminal device, a first publishing message to publish data for the topic and transmitting a second publishing message including at least the first publishing message towards the first terminal device via the network exposure node. In addition, the MQTT-SN gateway may further receive, from the first terminal device, a third acknowledgement message in response to the second publishing message via the network exposure node and determine whether to continue the data publishing of the second terminal device based at least on the third acknowledgement message.

In an example, the second publishing message may include a first parameter indicating a size of the data to be published, a second parameter indicating whether there is a subsequent block for the data to be published, and a third parameter indicating a data block index. In some embodiments, the third acknowledgement message may include a first return code indicating continuation of data publishing. In some embodiments, the third acknowledgement message may include a second return code indicating rejection of data publishing with a reason of oversize.

In some other embodiments, the third acknowledgement message may be a PUBREC message according to the MQTT-SN protocol. In such embodiments, the third acknowledgement message may include a third return code indicating one of the following for data publishing: acceptance, rejection with a reason, continuation, or reserve.

Figure 5:
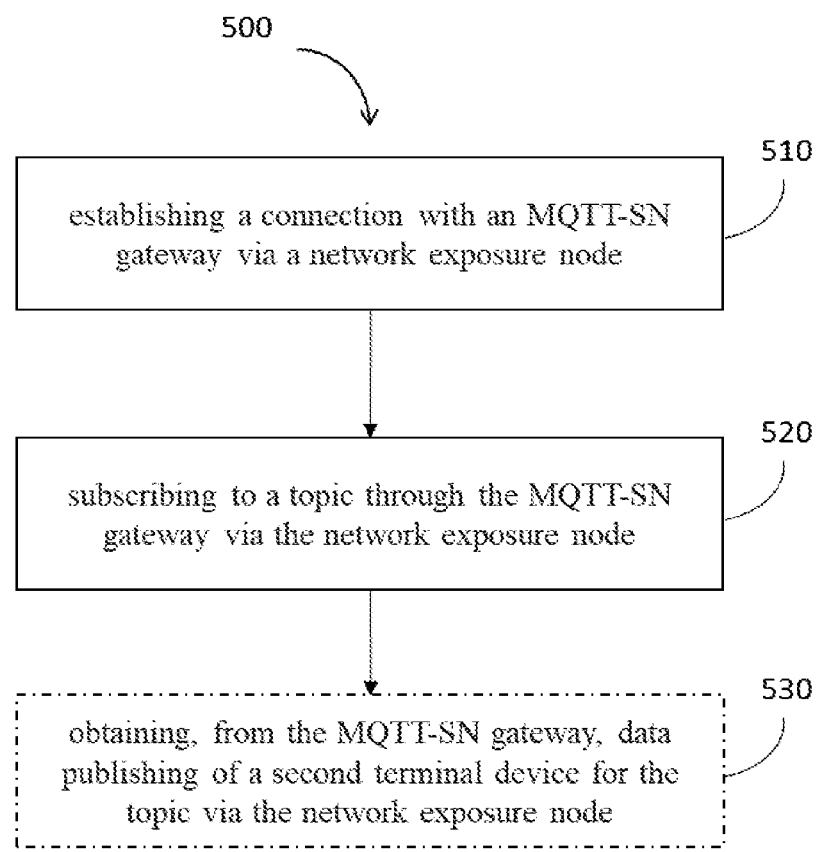
FIG. 5 is a flowchart illustrating a method performed in a Non-IP device according to an embodiment of the present disclosure.

FIG. 5 shows a flowchart illustrating a method 500 performed in a Non-IP device, particularly a Non-IP client running on the Non-IP device, e.g. Non-IP client 210-1 as shown in FIGS. 2A and 2B, according to an embodiment of the present disclosure.

As illustrated, at block 510, the Non-IP device establishes a connection with an MQTT-SN gateway, e.g. the MQTT-SN gateway 240 as shown in FIGS. 2A and 2B, via a network exposure node, e.g. SCEF/NEF 220 as shown in FIGS. 2A and 2B.

In different embodiments of the present disclosure, the MQTT-SN gateway may be collocated with an MQTT server as shown in FIG. 2A or may be connected to the MQTT server according to the MQTT protocol as shown in FIG. 2B.

At block 520, the Non-IP device subscribes to a topic through the MQTT-SN gateway via the network exposure node. Optionally, at block 530, the Non-IP device obtains, from the MQTT-SN gateway, data publishing of a second terminal device, particularly an IP client or a Non-IP client running on the second terminal device, e.g. IP client 260 or Non-IP client 210-2 as shown in FIGS. 2A and 2B, for the topic via the network exposure node.

Please note that the subscription and publishing may be independent. That means, the subscription can be performed without subsequent publishing operations, while the publishing can also be performed without previous subscription operations.

In an embodiment of the present disclosure, the Non-IP device may establish the connection by transmitting, towards the MQTT-SN gateway, a connection message to setup a connection with the MQTT-SN gateway via the network exposure node and receiving, from the MQTT-SN gateway, a first acknowledgement message in response to the connection message via the network exposure node.

In an embodiment of the present disclosure, the Non-IP device may subscribe to the topic by transmitting, towards the MQTT-SN gateway, a subscription message to subscribe to the topic via the network exposure node and receiving, from the MQTT-SN gateway, a second acknowledgement message in response to the subscription message via the network exposure node.

In an embodiment of the present disclosure, the Non-IP device may obtain the data publishing by receiving, from the MQTT-SN gateway, a publishing message of the second terminal device, e.g. IP client 260 or Non-IP client 210-2 running on the second terminal device, to publish data for the topic via the network exposure node and additionally, transmitting, towards the MQTT-SN gateway, a third acknowledgement message in response to the publishing message via the network exposure node.

In an example, the publishing message may include a first parameter indicating a size of the data to be published, a second parameter indicating whether there is a subsequent block for the data to be published, and a third parameter indicating a data block index. In some embodiments, the third acknowledgement message may include a first return code indicating continuation of data publishing. In some embodiments, the third acknowledgement message may include a second return code indicating rejection of data publishing with a reason of oversize.

In some other embodiments, the third acknowledgement message may be a PUBREC message according to the MQTT-SN protocol. In such embodiments, the third acknowledgement message may include a third return code indicating one of the following for data publishing: acceptance, rejection with a reason, continuation, or reserve.

Figure 6:
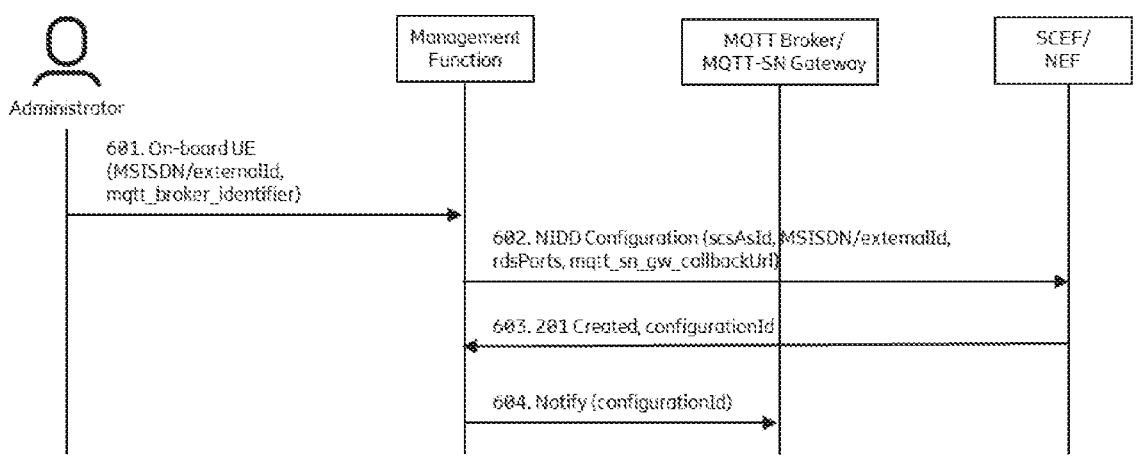
FIG. 6 illustrates an onboarding procedure via a network exposure node for a Non-IP device.

For completeness of the technical solution, FIG. 6 illustrates an onboarding procedure for a Non-IP device, via a network exposure node, e.g. SCEF/NEF. The Management Function is a function to facilitate the device onboarding procedure, which may be part of an AS. In this procedure, NIDD Configuration of the SCEF/NEF will be triggered. NIDD Configuration is the prerequisite of sending/receiving Non-IP messages.

Administrator onboards at 601 the Non-IP device through the Management Function by specifying identifiers of the Non-IP device and the MQTT-SN Gateway to be connected. The Non-IP device can connect with multiple MQTT-SN Gateways by using different Reliable Data Service (RDS) ports.

The Management Function then sends at 602 a NIDD Configuration request to the SCEF/NEF on-behalf-of the MQTT-SN Gateway. In the NIDD Configuration request, the 'mqtt_sn_gw_callbackUrl' is pointed to an HTTP (Hyper Text Transfer Protocol) endpoint provided by the MQTT-SN Gateway. The SCEF/NEF returns at 603 response of 201 indicating configuration being Created and the 'configurationId'. The Management Function notifies at 604 the MQTT-SN Gateway with the 'configurationId'.

Figure 7A:
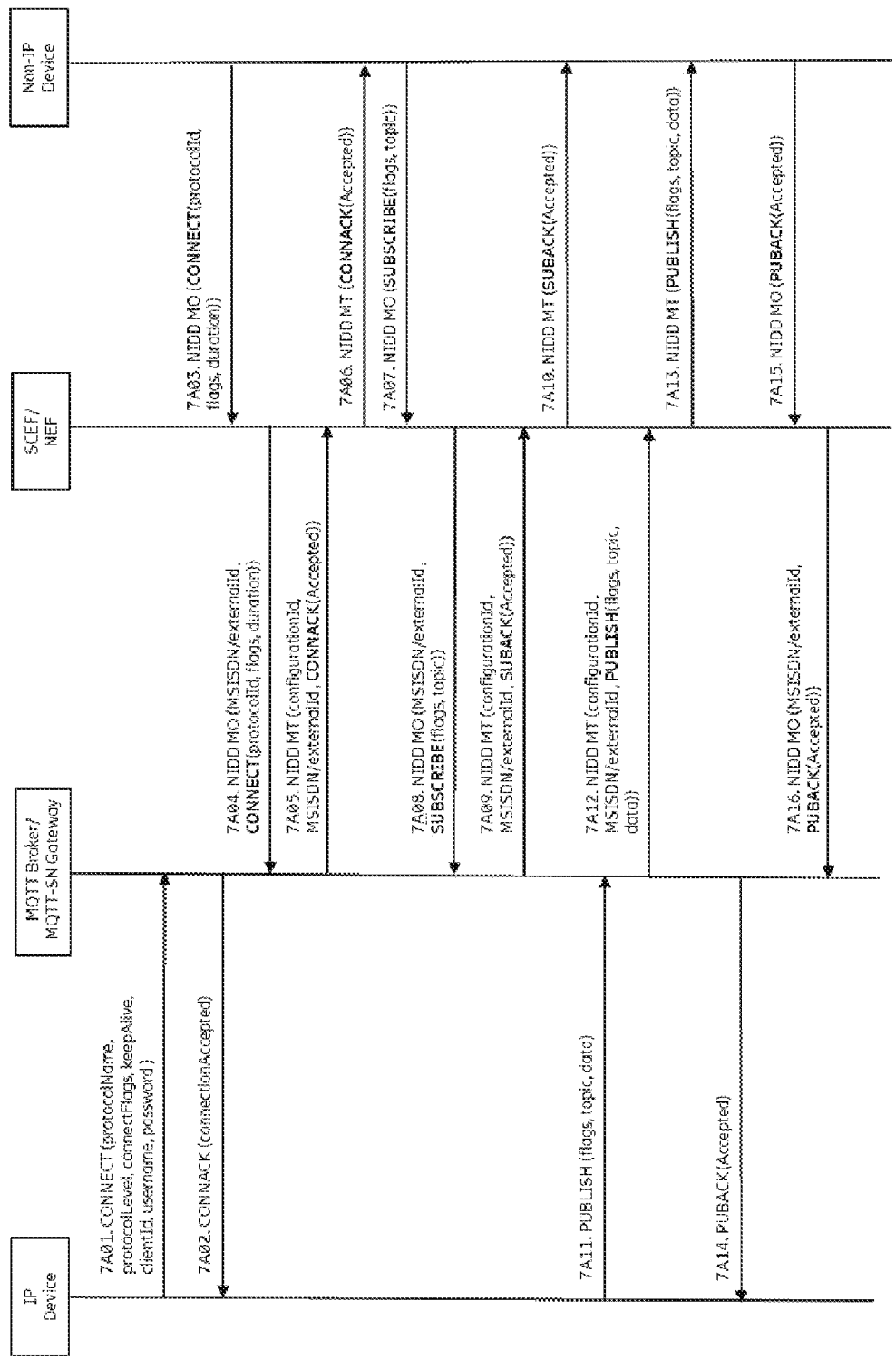
FIG. 7A illustrates a typical example of traffic flow between an IP device and a Non-IP device via a network exposure node according to an embodiment of the present disclosure.

FIG. 7A illustrates a typical example of traffic flow between an IP device (which may correspond to the second terminal device in method 300, 400 or 500), and a Non-IP device (which may correspond to the first terminal device in method 300, 400 or 500) via a network exposure node, e.g. SCEF/NEF, according to an embodiment of the present disclosure. In the present disclosure, the parameters used in a specific message (as shown in FIGS. 7A-10) without particular definitions in the Detailed Description are compliant with the definitions in the MQTT protocol (e.g. MQTT version 5.0) and the MQTT-SN protocol (e.g. MQTT-SN protocol specification version 1.2), which thus will not be specified herein.

As illustrated, the IP Client sends at 7A01 a CONNECT message to a MQTT Broker (i.e. MQTT server) to establish a connection. At 7A02, the MQTT Broker responds the IP device with a CONNACK message.

At 7A03, a Non-IP device sends a CONNECT message (which may correspond to the connection message in method 300, 400 or 500) in a NIDD MO message towards the SCEF/NEF to establish a virtual connection with an MQTT-SN Gateway. Though in FIG. 7, the MQTT-SN Gateway is illustrated as collocated with the MQTT Broker, it shall be appreciated that the MQTT-SN Gateway can be separated from and connected to the MQTT Broker according to the MQTT protocol.

'clientId' parameter is needed in the CONNECT message according to the MQTT-SN specification. In Non-IP binding at transport layer to MQTT-SN through SCEF/NEF, it is recommended to use either MSISDN (Mobile Station International Subscriber Directory Number) or externalId in SCEF/NEF context as the clientId in MQTT-SN context. Since the SCEF/NEF can provide MSISDN/externalId at transport layer, the CONNECT message may omit 'clientId' parameter.

Then at 7A04, the SCEF/NEF forwards the CONNECT message to the MQTT-SN Gateway according to the NIDD Configuration created by the Management Function in the 'Non-IP Device Onboarding' procedure as illustrated above with reference to FIG. 6.

At 7A05, the MQTT-SN Gateway sends a CONNACK message (which may correspond to the first acknowledgement message in method 300, 400 or 500) in a NIDD MT message towards the SCEF/NEF.

At 7A06, the SCEF/NEF forwards the CONNACK message to the Non-IP device.

At 7A07, the Non-IP device sends a SUBSCRIBE message (which may correspond to the subscription message in method 300, 400 or 500) in a NIDD MO message towards SCEF/NEF to subscribe to a specific topic.

At 7A08, the SCEF/NEF forwards the SUBSCRIBE message to the MQTT-SN Gateway.

At 7A09, the MQTT-SN Gateway sends a SUBACK message (which may correspond to the second acknowledgement message in method 300, 400 or 500) in a NIDD MT message towards the SCEF/NEF.

At 7A10, the SCEF/NEF forwards the SUBACK message to the Non-IP device.

At 7A11, the IP device sends a PUBLISH message (which may correspond to the first publishing message in method 300, 400 or 500) to the MQTT Broker to publish data to the topic.

At 7A12, the MQTT-SN Gateway sends a PUBLISH message including at least the content of the PUBLISH message received at 7A11 (which may correspond to the second publishing message in method 300, 400 or 500) in a NIDD MT message towards the SCEF/NEF.

At 7A13, the SCEF/NEF forwards the PUBLISH message to the Non-IP device.

At 7A14, the MQTT Broker responds the IP device with a PUBACK message.

At 7A15, the Non-IP device sends a PUBACK message in a NIDD MO message (which may correspond to the third acknowledgement message in method 300, 400 or 500) towards the SCEF/NEF.

At 7A16, the SCEF/NEF forwards the PUBACK message to the MQTT-SN Gateway.

Please note that the MQTT Broker may respond to the PUBLISH message of the IP device with a PUBACK message after receiving the PUBACK message from the Non-IP device. So, step 7A14 may be after step 7A16.

Figure 7B:
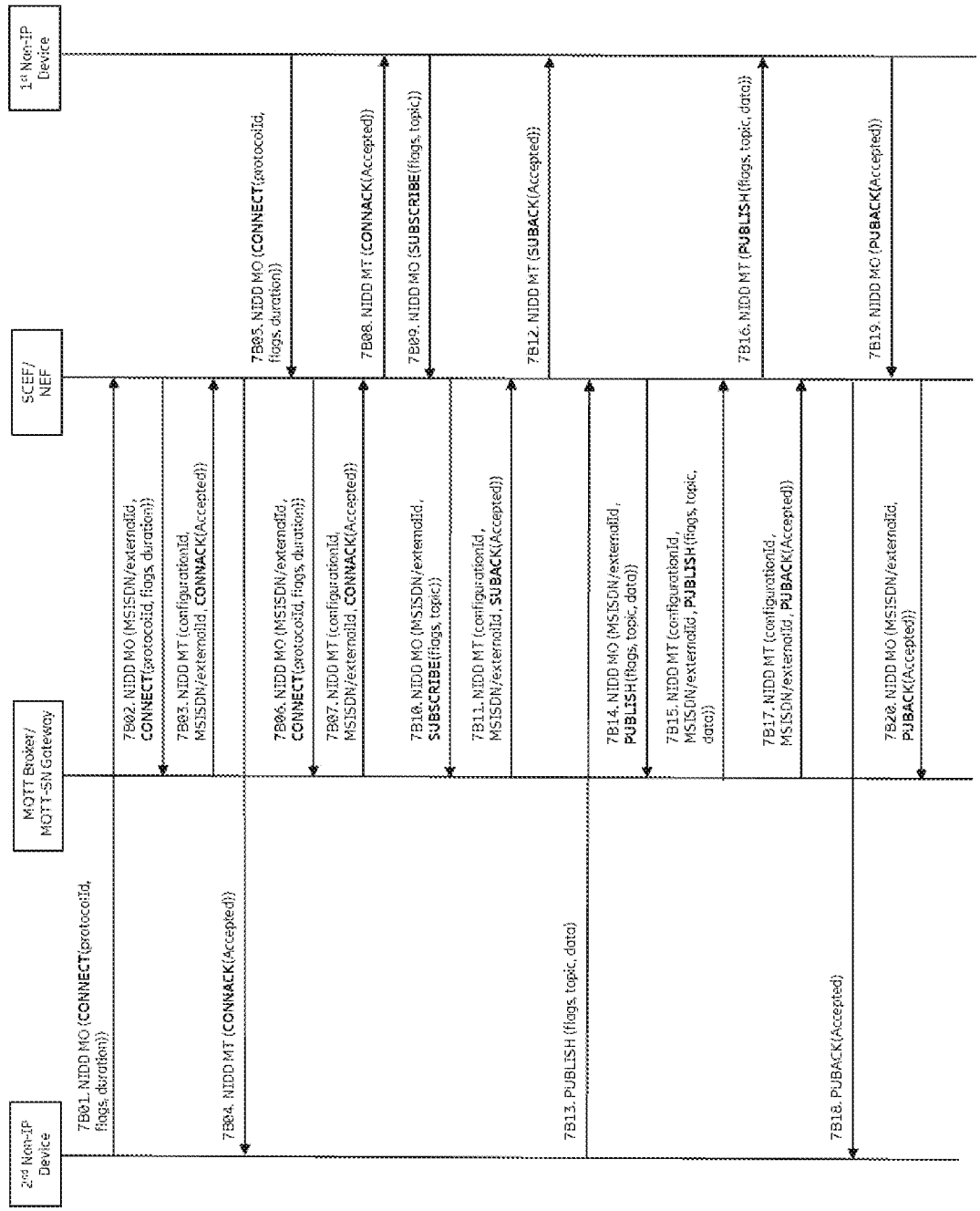
FIG. 7B illustrates a typical example of traffic flow between two Non-IP devices via a network exposure node according to an embodiment of the present disclosure.

FIG. 7B illustrates a typical example of traffic flow between a Non-IP device (which may correspond to the first terminal device in method 300, 400 or 500), and another Non-IP device (which may correspond to the second terminal device in method 300, 400 or 500) via a network exposure node, e.g. SCEF/NEF, according to an embodiment of the present disclosure.

The only difference between the traffic flows of FIG. 7B and FIG. 7A lies in that there is no direct communication between the second terminal device (i.e. $2^{nd}$ Non-IP device) and the MQTT Broker/MQTT-SN Gateway. The communication between the second terminal device and the MQTT Broker/MQTT-SN Gateway needs to be via the SCEF/NEF. In the following, only the different steps will be described.

As illustrated, the $2^{nd}$ Non-IP device sends at 7B01 a CONNECT message to SCEF/NEF to establish a connection with an MQTT-SN Gateway.

At 7B02, the SCEF/NEF forwards the CONNECT message to the MQTT-SN gateway.

At 7B03, the MQTT-SN Gateway sends a CONNACK message in response to the CONNECT message to the SCEF/NEF.

At 7B04, the SCEF/NEF sends the CONNACK message to the $2^{nd}$ Non-IP device.

Steps 7B05~7B12 are the same as steps P7A03~7A10, which thus will be omitted herein.

At 7B13, the Non-IP device sends a PUBLISH message (which may correspond to the first publishing message in method 400) to the SCEF/NEF, which then forwards at 7B14 the PUBLISH message to the MQTT-SN Gateway/MQTT Broker.

Steps 7B15~7B16 are the same as steps P7A12~7A13, which thus will be omitted herein.

At 7B17, the MQTT-SN Gateway sends a PUBACK in response to the PUBLISH message towards the SCEF/NEF.

At 7B18, the SCEF/NEF sends the PUBACK message to the 2$^{nd}$ Non-IP device.

At 7A15, the Non-IP device sends a PUBACK message in a NIDD MO message (which may correspond to the third acknowledgement message in method 300, 400 or 500) towards the SCEF/NEF.

Steps 7B19~7B20 are the same as steps 7A15~7A16, which thus will be omitted herein.

Figure 8:
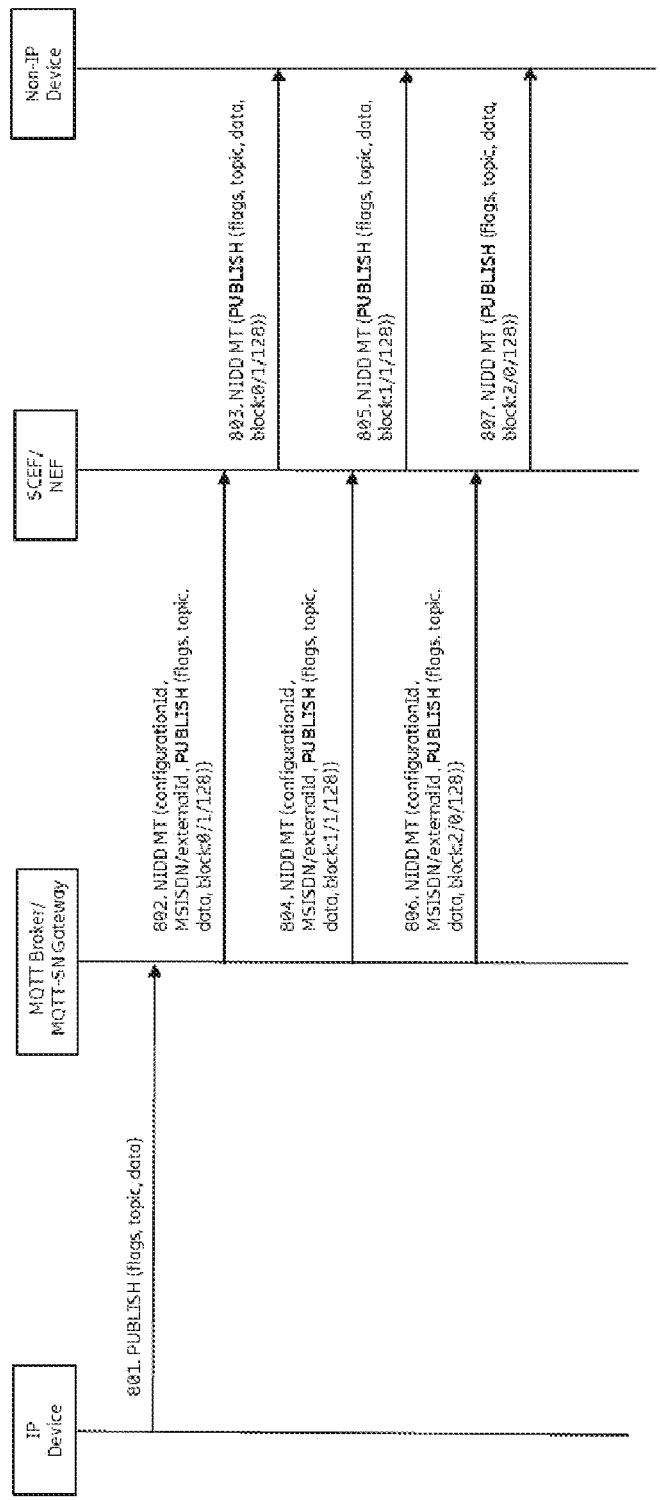
FIG. 8 illustrates a specific example of traffic flow for data publishing as illustrated in FIG. 7 according to an embodiment of the present disclosure, in which QoS=0 is supported.

FIG. 8 illustrates a specific example of traffic flow for data publishing as illustrated in FIG. 7A according to an embodiment of the present disclosure, in which QoS=0 is supported.

As illustrated in FIG. 8, at 801, the IP device sends a PUBLISH message to the MQTT Broker to publish data to the topic. In an embodiment that a Non-IP device publishes data, the Non-IP device will send at 801 a PUBLISH message via the SCEF/NEF to the MQTT Broker/MQTT-SN Gateway. The following steps are the same as the embodiment of FIG. 8.

At 802, the MQTT-SN Gateway sends a PUBLISH message with the 1$^{st}$ block of data to be published in a NIDD MT message towards the SCEF/NEF. In the PUBLISH message, a 'Block' header is included, which includes a first parameter indicating a size of the data to be published, a second parameter indicating whether there is a subsequent block for the data to be published, and a third parameter indicating a data block index. In this example, the 'Block' header is '0/1/128'. The value '128' (which corresponds to the first parameter) indicates the block size of 128 bytes. The second bit '1' (which corresponds to the second parameter) indicates there will be more subsequent blocks. The first bit '1' (which corresponds to the third parameter) indicates the current block is the 1st block.

At 803, the SCEF/NEF forwards the PUBLISH message to the Non-IP device.

Since the previous 'Block' header at 803 indicates that there will be more blocks, at 804, the MQTT-SN Gateway sends a PUBLISH message with the 2nd block of the data to be published in a NIDD MT message towards the SCEF/NEF. The 'Block' header is '1/1/128', indicating the 2nd block, more subsequent blocks and the block size of 128 bytes.

At 805, the SCEF/NEF forwards the PUBLISH message to the Non-IP device.

Since the previous 'Block' header at 804 indicates that there will be more blocks, at 806, the MQTT-SN Gateway sends a PUBLISH message with the 3rd block of the data to be published in a NIDD MT message towards the SCEF/NEF. The 'Block' header is '2/0/128'. The first bit '2' indicates the 3rd block; the second bit '0' indicates there will be no more subsequent blocks; and the value '128' indicates that the block size is 128 bytes.

At 807, the SCEF/NEF forwards the PUBLISH message to the Non-IP device.

Figure 9:
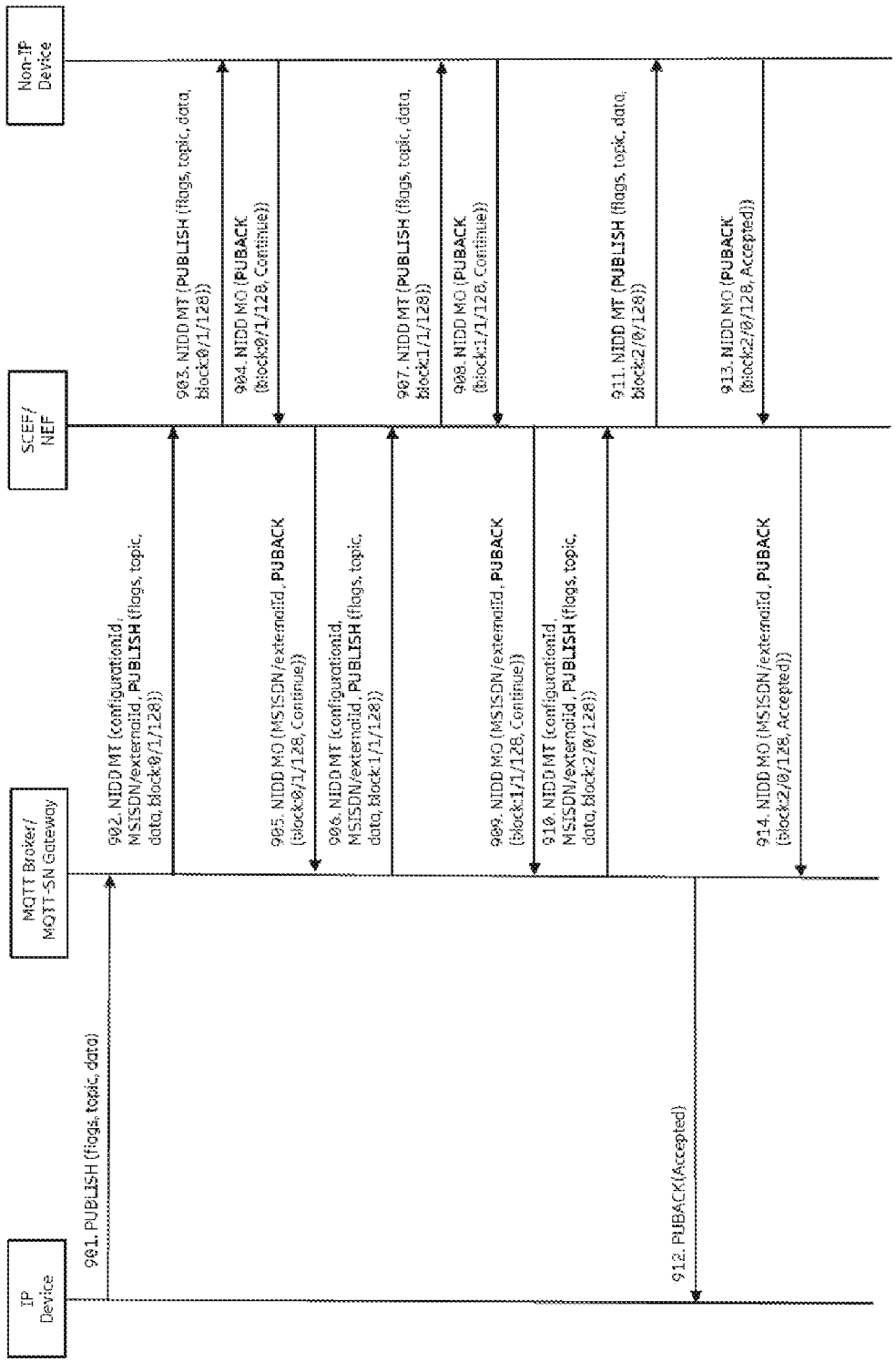
FIG. 9 illustrates another specific example of traffic flow for data publishing as illustrated in FIG. 7 according to an embodiment of the present disclosure, in which QoS=1 is supported.

FIG. 9 illustrates another specific example of traffic flow for data publishing as illustrated in FIG. 7 according to an embodiment of the present disclosure, in which QoS=1 is supported.

As illustrated, at 901, the IP device sends a PUBLISH message to the MQTT Broker to publish data to the topic. In an embodiment that a Non-IP device publishes data, the Non-IP device will send at 901 a PUBLISH message via the SCEF/NEF to the MQTT Broker/MQTT-SN Gateway. The following steps are the same as the embodiment of FIG. 9 unless particularly indicated.

At 902, the MQTT-SN Gateway sends a PUBLISH message with the 1st block of data to be published in a NIDD MT message towards the SCEF/NEF. As mentioned above, the 'Block' header of '0/1/128' is included, which indicates the 1st block, more subsequent blocks and the block size of 128 bytes.

At 903, the SCEF/NEF forwards the PUBLISH message to the Non-IP device.

At 904, the Non-IP device sends a PUBACK message with a return code 'Continue' in a NIDD MO message towards the SCEF/NEF.

Figure 10:
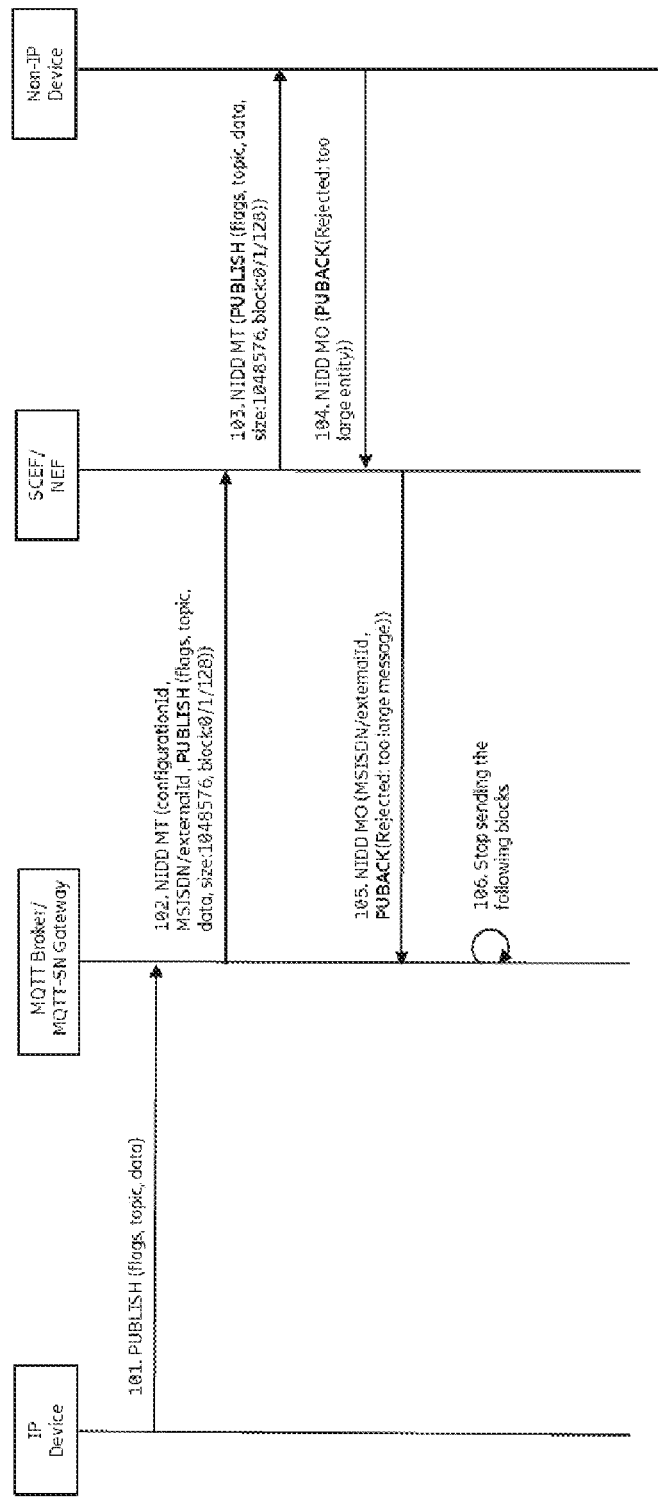
FIG. 10 illustrates an example of traffic flow when the data publishing is rejected according to an embodiment of the present disclosure.

In an embodiment, the return code may have another value 'Rejected' with a reason of oversize, indicating that the data publishing will be rejected since the data size is too large, e.g. larger than an acceptable threshold of the Non-IP device, as illustrated in FIG. 10. In this embodiment, the data size is 1048576, which is too large to be accepted by the Non-IP device. Thus, the Non-IP device sends a PUBACK message with a return code of 'Rejected: too large message' to the SCEF/NEF so as to reject that data publishing. Please note, the reason may be described in other words or terms as long as it indicates the rejection reason of oversize.

At 905, the SCEF/NEF forwards the PUBACK message to the MQTT-SN Gateway.

The MQTT-SN gateway may determine whether to continue the data publishing of the IP device based at least on the return code included in the PUBACK message. For example, if the return code indicates 'Continue' and the 'Block' header indicates there are more blocks, the MQTT-SN gateway will continue the data publishing; if the return code indicates 'Rejected', the MQTT-SN gateway will stop the data publishing; or if the return code indicates 'Accepted', the data publishing has been accepted and all blocks of the data to be published are received.

At 906, since the 'Block' header indicates there are more blocks and the return code 'Continue' indicates continuation of the data publishing, the MQTT-SN Gateway sends a PUBLISH message with the 2nd block of the data to be published in a NIDD MT message towards the SCEF/NEF. The 'Block' header is '1/1/128' which indicates the 2nd block, more subsequent blocks and the block size of 128 bytes.

At 907, the SCEF/NEF forwards the PUBLISH message to the Non-IP device.

At 908, the Non-IP device sends a PUBACK message with a return code 'Continue' in a NIDD MO message towards the SCEF/NEF.

At 909, the SCEF/NEF forwards the PUBACK message to the MQTT-SN Gateway.

At 910, the MQTT-SN Gateway sends a PUBLISH message with the 3rd block of the data to be published in a NIDD MT message towards the SCEF/NEF. The 'Block' header is '2/0/128', which indicates the 3rd block, the last block of the data to be published, and the block size of 128 bytes.

At 911, the SCEF/NEF forwards the PUBLISH message to the Non-IP device.

At 912, the MQTT Broker responds with a PUBACK message to the IP device. In the embodiment that the Non-IP device publishes data, the MQTT Broker/MQTT-SN Gateway will send at 912 a PUBLISH message via the SCEF/NEF to the Non-IP device publishing the data.

At 913, the Non-IP device sends a PUBACK message with a return code 'Accepted' in a NIDD MO message towards the SCEF/NEF. The return code 'Accepted' indicates the acceptance of the data publishing.

At 914, the SCEF/NEF forwards the PUBACK message to the MQTT-SN Gateway.

Please note that the MQTT Broker may respond to the PUBLISH message of the IP device with a PUBACK message after receiving the PUBACK message from the Non-IP device. So, step 912 may be after step 914.

Figure 11:
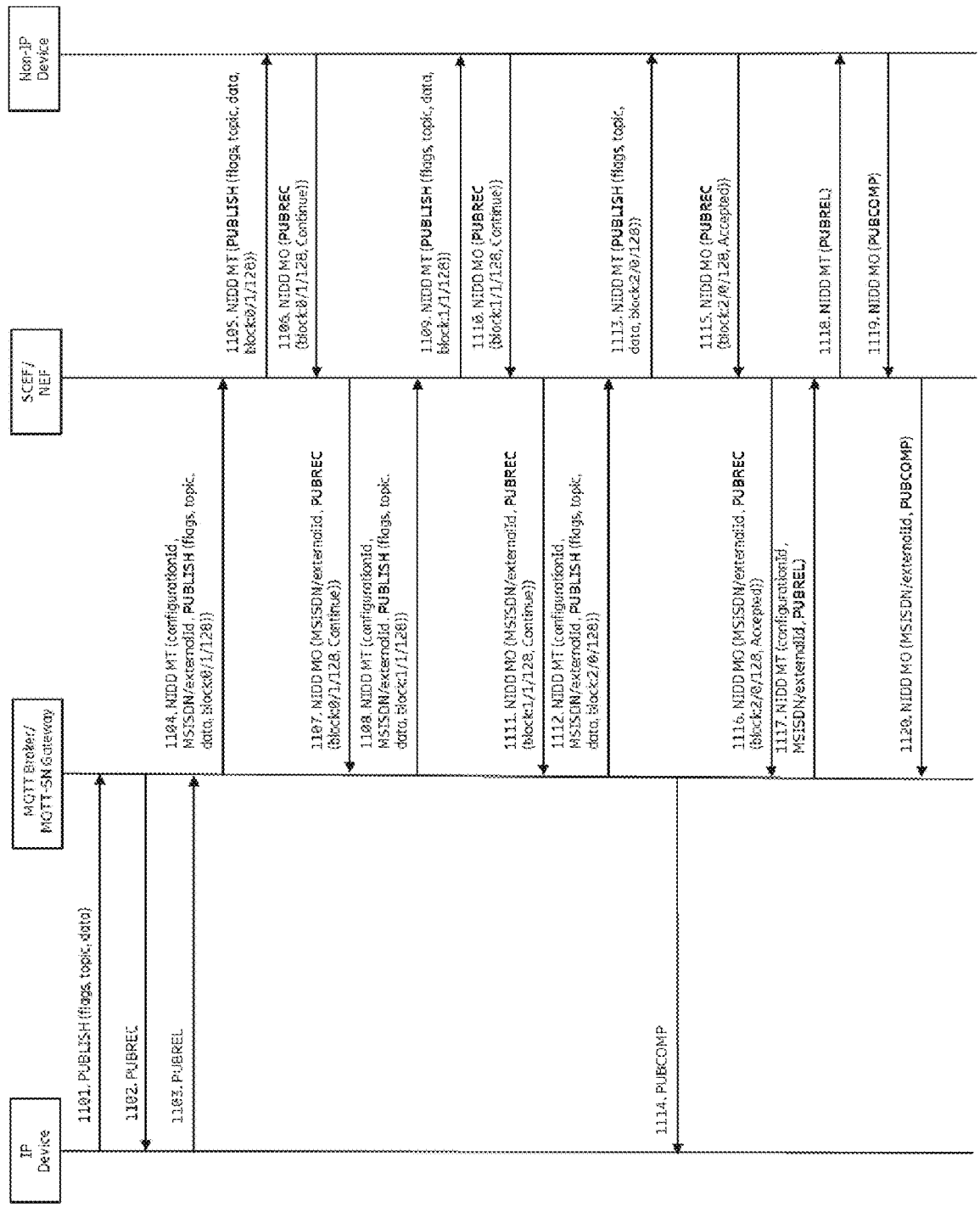
FIG. 11 illustrates another specific example of traffic flow for data publishing as illustrated in FIG. 7 according to an embodiment of the present disclosure, in which QoS=2 is supported.

FIG. 11 illustrates another specific example of traffic flow for data publishing as illustrated in FIG. 7 according to an embodiment of the present disclosure, in which QoS=2 is supported.

As illustrated in FIG. 11, at 1101, the IP device sends a PUBLISH message to the MQTT Broker to publish data to the topic. In an embodiment that a Non-IP device publishes data, the Non-IP device will send at 1101 a PUBLISH message via the SCEF/NEF to the MQTT Broker/MQTT-SN Gateway. The following steps are the same as the embodiment of FIG. 11 unless particularly indicated.

At 1102, the MQTT Broker responds with a PUBREC message to the IP device. In the embodiment that the Non-IP device publishes data, the MQTT Broker responds with a PUBREC message and the MQTT-SN Gateway sends at 1102 the PUBREC message to the Non-IP device via the SCEF/NEF.

At 1103, the IP device sends a PUBREL message to the MQTT Broker. In the embodiment that the Non-IP device publishes data, the Non-IP device sends at 1103 a PUBREL message to the MQTT Broker/MQTT-SN Gateway via the SCEF/NEF.

At 1104, the MQTT-SN Gateway sends a PUBLISH message with the 1st block of data to be published in a NIDD MT message towards the SCEF/NEF. The 'Block' header is '0/1/128' which has the same meaning as mentioned above, i.e. the 1st block, more subsequent blocks and the block size of 128 bytes.

At 1105, the SCEF/NEF forwards the PUBLISH message to the Non-IP device.

At 1106, the Non-IP device sends a PUBREC message (which may correspond to the third acknowledgement message in method 300, 400 or 500) with a return code 'Continue' in a NIDD MO message towards the SCEF/NEF. The return code 'Continue' indicates continuation of data publishing.

In some other embodiments of the present disclosure, the PUBREC may also include a return code indicating one of the following for data publishing: acceptance, rejection with a reason, or reserve.

At 1107, the SCEF/NEF forwards the PUBREC message to the MQTT-SN Gateway.

Since the previous 'Block' header indicates that there will be more blocks, and the return code indicates continuation, at 1108, the MQTT-SN Gateway sends a PUBLISH message with the 2nd block of the data to be published in a NIDD MT message towards the SCEF/NEF. The 'Block' header is '1/1/128' which indicates the 2nd block, more subsequent blocks and the block size of 128 bytes.

At 1109, the SCEF/NEF forwards the PUBLISH message to the Non-IP device.

At 1110, the Non-IP device sends a PUBREC message with a return code 'Continue' in a NIDD MO message towards the SCEF/NEF.

At 1111, the SCEF/NEF forwards the PUBREC message to the MQTT-SN Gateway.

At 1112, the MQTT-SN Gateway sends a PUBLISH message with the 3rd block of the data to be published in a NIDD MT message towards the SCEF/NEF. The 'Block' header of '2/0/128' indicates the 3rd block, the last block of the data to be published and the block size of 128 bytes.

At 1113, the SCEF/NEF forwards the PUBLISH message to the Non-IP device.

At 1114, the MQTT Broker responds with a PUBCOMP message to the IP device. In the embodiment that the Non-IP device publishes data, the MQTT Broker responds with a PUBCOMP message and the MQTT-SN Gateway sends at 1114 the PUBCOMP message to the Non-IP device via the SCEF/NEF.

At 1115, the Non-IP device sends a PUBREC message with a return code 'Accepted' in a NIDD MO message towards the SCEF/NEF. The return code 'Accepted' indicates the acceptance of the data publishing and all blocks of the data to be published are received.

At 1116, the SCEF/NEF forwards the PUBREC message to the MQTT-SN Gateway.

At 1117, the MQTT-SN Gateway sends a PUBREL message in a NIDD MT message towards the SCEF/NEF.

At 1118, the SCEF/NEF forwards the PUBREL message to the Non-IP device.

At 1119, the Non-IP device sends a PUBCOMP message in a NIDD MO message towards the SCEF/NEF.

At 1120, the SCEF/NEF forwards the PUBCOMP message to the MQTT-SN Gateway.

Please note that the MQTT Broker may respond to the PUBLISH message of the IP device with a PUBCOMP message after receiving the PUBCOMP message from the Non-IP device. So, step 1114 may be after step 1120.

Figure 12:
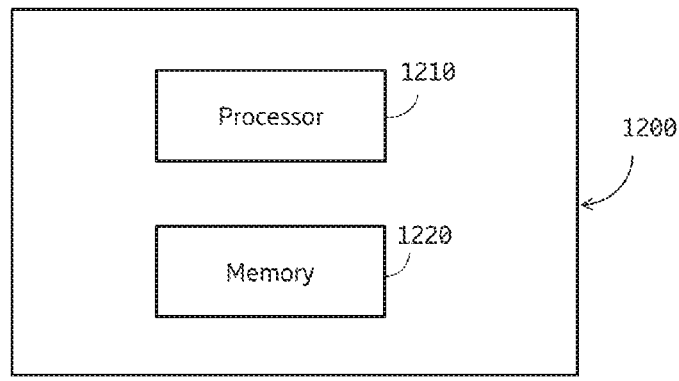
FIG. 12 is a block diagram of a network device, which may be implemented as a network exposure node, an MQTT-SN gateway, or Non-IP device according to various embodiments of the present disclosure.

FIG. 12 shows a block diagram of a network device 1200, which may be implemented as a network exposure node, an MQTT-SN gateway, or Non-IP device according to various embodiments of the present disclosure. The network device 1200 comprises at least one processor 1210 and at least one memory 1220.

In the embodiments where the network device 1200 is implemented as the network exposure node, the memory 1220 comprises instructions executable by the processor 1210 whereby the network exposure node is operative to perform the method 300 according to the embodiments as described above with reference to FIG. 3.

In the embodiments where the network device 1200 is implemented as the MQTT-SN gateway, the memory 1220 comprises instructions executable by the processor 1210 whereby the MQTT-SN gateway is operative to perform the method 400 according to the embodiments as described above with reference to FIG. 4.

In the embodiments where the network device 1200 is implemented as the Non-IP device, the memory 1220 comprises instructions executable by the processor 1210 whereby the Non-IP device is operative to perform the method 500 according to the embodiments as described above with reference to FIG. 5.

The processor 1210 may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The memory 1220 may comprise a non-transitory computer readable storage medium on which computer program including the instructions is stored. For example, the memory may be a flash memory, a Random-access memory (RAM), a Read-Only Memory (ROM), or an EEPROM.

Figure 13:
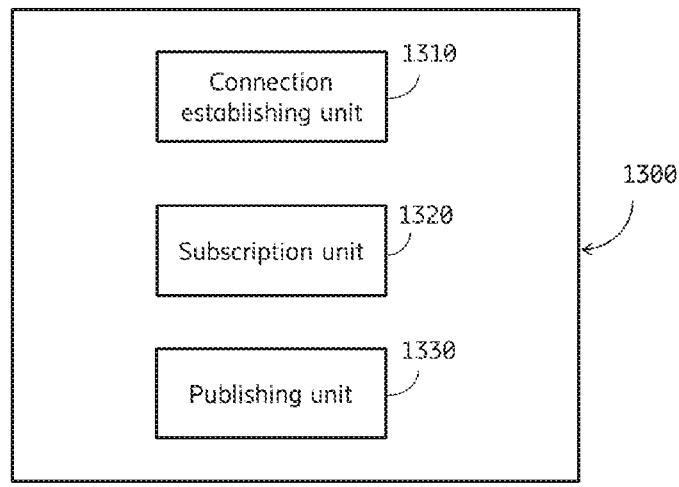
FIG. 13 is a block diagram of a network exposure node according to an embodiment of the present disclosure.

FIG. 13 is a block diagram of a network exposure node 1300 according to an embodiment of the present disclosure.

As shown in FIG. 13, the network exposure node 1300 comprises a connection establishing unit 1310 configured to establish a connection between a first terminal device, e.g. a Non-IP device, and an MQTT-SN gateway. The network exposure node 1300 also comprises a subscription unit 1320 configured to facilitate subscription of the first terminal device to a topic via the MQTT-SN gateway. The network exposure node 1300 further comprises a publishing unit 1330 configured to facilitate data publishing of a second terminal device, e.g. an IP device, for the topic towards the first terminal device via the MQTT gateway.

In various embodiments, the connection establishing unit 1310, the subscription unit 1320, and the publishing unit 1330 may be configured to operate according to the method 300 as described above with reference to FIG. 3. The details of the operations will not be repeated herein.

Figure 14:
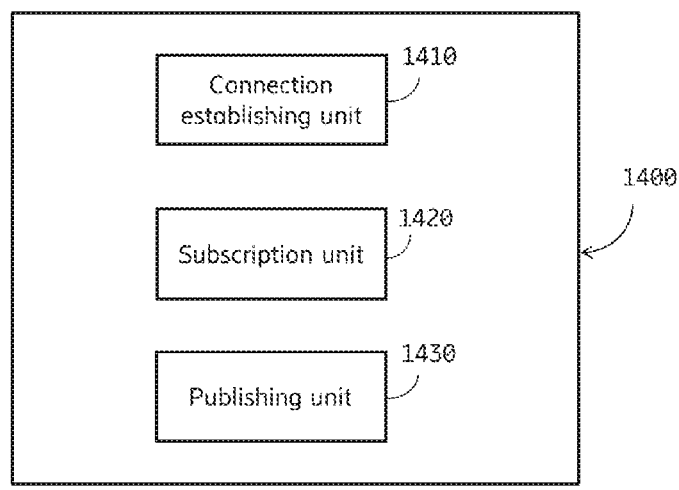
FIG. 14 is a block diagram of an MQTT-SN gateway according to an embodiment of the present disclosure.

FIG. 14 is a block diagram of an MQTT-SN gateway 1400 according to an embodiment of the present disclosure.

As shown in FIG. 14, the MQTT-SN gateway 1400 comprises a connection establishing unit 1410 configured to establishing a connection with a first terminal device, e.g. a Non-IP device, via a network exposure node. The MQTT-SN gateway 1400 also comprises a subscription unit 1420 configured to facilitate subscription of the first terminal device to a topic via the network exposure node. The MQTT-SN gateway 1400 further comprises a publishing unit 1430 configured to facilitate data publishing of a second terminal device for the topic towards the first terminal device via the network exposure node.

In various embodiments, the connection establishing unit 1410, the subscription unit 1420, and the publishing unit 1430 may be configured to operate according to the method 400 as described above with reference to FIG. 4. The details of the operations will not be repeated herein.

Figure 15:
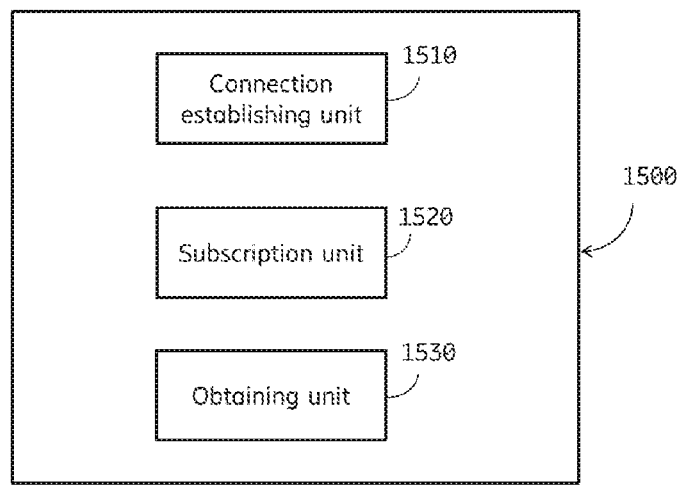
FIG. 15 is a block diagram of a Non-IP device according to an embodiment of the present disclosure.

FIG. 15 is a block diagram of a Non-IP device 1500 according to an embodiment of the present disclosure.

As shown in FIG. 15, the Non-IP device 1500 comprises a connection establishing unit 1510 configured to establish a connection with an MQTT-SN gateway via a network exposure node. The Non-IP device 1500 also comprises a subscription unit 1520 configured to subscribe to a topic through the MQTT-SN gateway via the network exposure node. The Non-IP device 1500 further comprises an obtaining unit 1530 configured to obtain, from the MQTT-SN gateway, data publishing of a second terminal device for the topic via the network exposure node.

In various embodiments, the connection establishing unit 1510, the subscription unit 1520, and the obtaining unit 1530 may be configured to operate according to the method 500 as described above with reference to FIG. 5. The details of the operations will not be repeated herein.

The present disclosure also provides a computer readable storage medium in the form of a non-volatile or volatile memory, e.g., a non-transitory computer readable storage medium, an Electrically Erasable Programmable Read-Only Memory (EEPROM), a flash memory, a Random-access memory (RAM), a Read-Only Memory (ROM), and a hard drive. A computer program product including a computer program may be stored on the computer readable storage medium. The computer program may include code/computer readable instructions, which when executed by processor 1210 causes the network device 1200 to perform the operations of the method described earlier in conjunction with FIG. 3 as a network exposure node, or to perform the operations of the method described earlier in conjunction with FIG. 4 as an MQTT-SN gateway, or to perform the operations of the method described earlier in conjunction with FIG. 5 as a Non-IP device.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Message Queuing Telemetry Transport for Sensor Network (MQTT-SN) gateway, the method comprising:
    establishing, by the MQTT-SN gateway, a connection with a first terminal device via a network exposure node, wherein the connection with the first terminal device is established according to an MQTT-SN protocol;
    establishing, by the MQTT-SN gateway, a connection to an MQTT server according to an MQTT protocol;
    translating between the MQTT-SN protocol and the MQTT protocol;
    facilitating, by the MQTT-SN gateway, subscription of the first terminal device to a topic via the network exposure node;
    receiving, by the MQTT-SN gateway, from a second terminal device, a first publishing message to publish data for the topic; and
    transmitting a second publishing message, including at least a block to be published, from the MQTT-SN gateway towards the first terminal device via the network exposure node, wherein the second publishing message includes a first parameter indicating a size of the data to be published, a second parameter indicating whether there is a subsequent block for the data to be published, and a third parameter indicating a data block index.

2. The method of claim 1, wherein establishing the connection comprises:
    receiving, by the MQTT-SN gateway, from the first terminal device, a connection message to setup a connection via the network exposure node; and
    in response to the connection message, transmitting a first acknowledgement message from the MQTT-SN gateway towards the first terminal device via the network exposure node.

3. The method of claim 1, wherein facilitating the subscription comprises:
    receiving, by the MQTT-SN gateway, from the first terminal device, a subscription message to subscribe to the topic via the network exposure node; and
    in response to the subscription message, transmitting a second acknowledgement message from the MQTT-SN gateway towards the first terminal device via the network exposure node.

4. The method of claim 3, wherein facilitating the subscription further comprises:
    translating the subscription message received from the first terminal device via the network exposure node from the MQTT-SN protocol to the MQTT protocol;
    transmitting the translated subscription message to the MQTT server;
    receiving an MQTT acknowledgement message from the MQTT server; and
    translating the MQTT acknowledgement message from the MQTT protocol into the second acknowledgement message according to the MQTT-SN protocol.

5. The method of claim 3, wherein the network exposure node implements a Network Exposure Function, NEF, of a $3^{rd}$ Generation Partnership Project (3GPP) communication network, wherein the NEF is configured to securely expose services and capabilities of the 3GPP communication network, wherein the first terminal device is a non-Internet Protocol (IP) device, and wherein said facilitating comprises transmitting the second acknowledgement message in a Non-Internet Protocol (IP) Data Delivery (NIDD) Mobile Terminated (MT) message towards the NEF.

6. The method of claim 3, wherein the network exposure node implements a Network Exposure Function, NEF, of a 3$^{rd}$ Generation Partnership Project (3GPP) communication network, wherein the NEF is configured to securely expose services and capabilities of the 3GPP communication network, wherein the first terminal device is a non-Internet Protocol (IP) device, and wherein said facilitating the data publishing comprises transmitting the second publishing message in a Non-Internet Protocol (IP) Data Delivery (NIDD) Mobile Terminated (MT) message towards the NEF.

7. The method of claim 1, further comprising:
receiving, by the MQTT-SN gateway, from the first terminal device, a third acknowledgement message in response to the second publishing message via the network exposure node; and
determining whether to continue the data publishing of the second terminal device based at least on the third acknowledgement message.

8. The method of claim 7, wherein the third acknowledgement message includes a first return code indicating continuation of data publishing, or wherein the third acknowledgement message includes a second return code indicating rejection of data publishing with a reason of oversize.

9. The method of claim 7, wherein
the third acknowledgement message is a PUBREC message according to an MQTT-SN protocol; and
the third acknowledgement message includes a third return code indicating one of the following for data publishing: acceptance, rejection with a reason, continuation, or reserve.

10. The method of claim 1, wherein the first terminal device is a non-Internet Protocol (IP) device.

11. A Message Queuing Telemetry Transport for Sensor Network (MQTT-SN) gateway comprising a processor and a memory, the memory comprising instructions executable by the processor whereby the MQTT-SN gateway is configured to:
establish a connection with a first terminal device via a network exposure node, wherein the connection with the first terminal device is established according to an MQTT-SN protocol;
establish, by the MQTT-SN gateway, a connection to an MQTT server according to an MQTT protocol;
translate between the MQTT-SN protocol and the MQTT protocol;
facilitate subscription of the first terminal device to a topic via the network exposure node;
receive, by the MQTT-SN gateway, from a second terminal device, a first publishing message to publish data for the topic; and
transmit a second publishing message, including at least a block to be published, from the MQTT-SN gateway towards the first terminal device via the network exposure node, wherein the second publishing message includes a first parameter indicating a size of the data to be published, a second parameter indicating whether there is a subsequent block for the data to be published, and a third parameter indicating a data block index.

12. The MQTT-SN gateway of claim 11, wherein the first terminal device is a non-Internet Protocol (IP) device.

13. A method in a non-Internet Protocol (Non-IP) device, the method comprising:
establishing a connection with a Message Queuing Telemetry Transport for Sensor Network (MQTT-SN) gateway via a network exposure node, wherein the connection with the MQTT-SN gateway is established according to an MQTT-SN protocol, wherein the MQTT-SN gateway is configured to interface the first terminal device with an MQTT server according to an MQTT protocol by translating between the MQTT-SN protocol and the MQTT protocol;
subscribing to a topic through the MQTT-SN gateway via the network exposure node; and
receiving, from the MQTT-SN gateway, a publishing message of a second terminal device to publish data for the topic via the network exposure node, wherein the publishing message includes a first parameter indicating a size of the data to be published, a second parameter indicating whether there is a subsequent block for the data to be published, and a third parameter indicating a data block index.

14. The method of claim 13, wherein establishing the connection comprises:
transmitting, towards the MQTT-SN gateway, a connection message to setup a connection with the MQTT-SN gateway via the network exposure node; and
receiving, from the MQTT-SN gateway, a first acknowledgement message in response to the connection message via the network exposure node.

15. The method of claim 13, wherein subscribing to the topic comprises:
transmitting, towards the MQTT-SN gateway, a subscription message to subscribe to the topic via the network exposure node; and
receiving, from the MQTT-SN gateway, a second acknowledgement message in response to the subscription message via the network exposure node.

16. The method of claim 13, further comprising transmitting, towards the MQTT-SN gateway, a third acknowledgement message in response to the publishing message via the network exposure node.

17. The method of claim 16, wherein the third acknowledgement message:
includes a first return code indicating continuation of data publishing; or
includes a second return code indicating rejection of data publishing with a reason of oversize; or
is a PUBREC message according to an MQTT-SN protocol and includes a third return code indicating one of the following for data publishing: acceptance, rejection with a reason, continuation, or reserve.

18. A non-Internet Protocol (Non-IP) device, the Non-IP device comprising a processor and a memory, the memory comprising instructions executable by the processor whereby the Non-IP device is configured to:
establish a connection with a Message Queuing Telemetry Transport for Sensor Network (MQTT-SN) gateway via a network exposure node, wherein the connection with the MQTT-SN gateway is established according to an MQTT-SN protocol, wherein the MQTT-SN gateway is configured to interface the first terminal device with an MQTT server according to an MQTT protocol by translating between the MQTT-SN protocol and the MQTT protocol;
subscribe to a topic through the MQTT-SN gateway via the network exposure node; and receive, from the MQTT-SN gateway, a publishing message of a second terminal device to publish data for the topic via the network exposure node, wherein the publishing message includes a first parameter indicating a size of the data to be published, a second parameter indicating whether there is a subsequent block for the data to be published, and a third parameter indicating a data block index.

* * * * *